(12) United States Patent
Segato

(10) Patent No.: US 7,549,698 B2
(45) Date of Patent: Jun. 23, 2009

(54) INTEGRATED HUMAN BODY SUPPORT STRUCTURE, PARTICULARLY A SADDLE OR SEAT FOR A VEHICLE

(75) Inventor: Stefano Segato, Vicenza (IT)

(73) Assignee: Selle Royal S.p.A., Pozzoleone (IT)

( * ) Notice: Subject to any disclaimer, the term of this patent is extended or adjusted under 35 U.S.C. 154(b) by 0 days.

(21) Appl. No.: 11/909,460

(22) PCT Filed: Mar. 22, 2006

(86) PCT No.: PCT/IB2006/000625

§ 371 (c)(1),
(2), (4) Date: Sep. 22, 2007

(87) PCT Pub. No.: WO2006/100564

PCT Pub. Date: Sep. 28, 2006

(65) Prior Publication Data

US 2008/0211271 A1   Sep. 4, 2008

(30) Foreign Application Priority Data

Mar. 24, 2005  (IT) .......................... VI2005A0088

(51) Int. Cl.
*B62J 1/00* (2006.01)
(52) U.S. Cl. ........................ 297/196; 297/198
(58) Field of Classification Search ................ 297/196, 297/198, 302.1, 215.16, 325
See application file for complete search history.

(56) References Cited

U.S. PATENT DOCUMENTS

| | | | | |
|---|---|---|---|---|
| 100,083 A * | 2/1870 | Stephan | ...................... | 297/196 |
| 448,739 A * | 3/1891 | Edwards | ...................... | 297/206 |
| 477,277 A * | 6/1892 | Smith | .......................... | 297/196 |
| 501,782 A * | 7/1893 | Harper | ........................ | 297/215 |
| 797,072 A * | 8/1905 | Perkin | ......................... | 297/196 |
| 822,660 A * | 6/1906 | Errick | ......................... | 297/196 |
| 3,104,129 A * | 9/1963 | Mack | ..................... | 297/215.16 |
| 4,889,385 A * | 12/1989 | Chadwick et al. | ......... | 297/300.1 |
| D344,649 S * | 3/1994 | Wilcox et al. | ................ | D6/500 |
| 5,573,304 A * | 11/1996 | Glockl | ..................... | 297/302.1 |
| 6,378,938 B1 | 4/2002 | Nelson | | |

FOREIGN PATENT DOCUMENTS

| | | |
|---|---|---|
| DE | 1012201 | 7/1957 |
| DE | 29520969 | 4/1997 |
| FR | 2306866 | 11/1976 |

* cited by examiner

*Primary Examiner*—Peter R. Brown
(74) *Attorney, Agent, or Firm*—Themis Law

(57) ABSTRACT

An integrated human body support structure, particularly a saddle or seat for a vehicle. The structure comprises an upper element (4) having longitudinal end portions (8, 8') and a lower element (5) having longitudinal end portions (9, 9'). The upper element (4) faces and is transversely spaced from said lower element (5). Furthermore, these elements are monolithically and elastically joined at one of their longitudinal ends (6) to define a gap (7) therebetween whereby the opposite free ends (8, 9) may adjust the gap (7) as the load applied to the structure changes. Thanks to this configuration the structure of the invention substantially helps to take up of the stresses from the vehicle on which the structure is mounted.

13 Claims, 3 Drawing Sheets

INTEGRATED HUMAN BODY SUPPORT STRUCTURE, PARTICULARLY A SADDLE OR SEAT FOR A VEHICLE

FIELD OF THE INVENTION

The present invention finds application in the field of support structures, and particularly relates to an integrated human body support structure as described in the preamble of claim 1.

BACKGROUND OF THE INVENTION

In the field of human body support structures, such as bicycle saddles, car seats or the like, is increasingly desired to provide a structure, which combines light weight and resistance to the various mechanical stresses that can occur during normal use of the vehicle. Also, attempts are being made to develop new solutions which increase seating comfort and provide a more effective distribution of cyclist's weight as well as an improved shock absorption.

As is known, in conventional saddles, the connection to the seat post is accomplished by rigid members, typically two metal rods, e.g. made of steel or an alloy, which are longitudinally arranged below the lower support of the saddle, at a proper distance from each other. These rods are secured to the saddle and the seat post by various mechanical connection means, such as plates and screws.

This conventional solution has the apparent drawback of adding weight to the structure and of employing an external element, which greatly affects aerodynamic properties. Also, metal structures do not allow simple and stable adjustments and the various stresses acting on the saddle during normal use may cause such rods to be misaligned with respect to the saddle structure.

Finally, with light weight being an aim of saddle design, increasingly expensive materials have been used, such as titanium or advanced composites, which are not always cost-effective.

In an attempt to obviate the above drawbacks, a few solutions have been proposed, in which the lower support of the saddle is solid with the connection to the seat post.

U.S. Pat. No. 6,561,578 discloses a bicycle saddle in which the connection with the seat post consists of a single longitudinally extending rail, formed integrally with the support. Nevertheless, this solution has the apparent drawback of further stiffening the whole structure of the saddle, thus preventing the insertion of any means for improving shock absorption.

Hence, the stresses associated to normal cycling can only dampened by the pad between the upper cover and the lower support. As a result, the stresses are poorly taken up by the saddle, and are almost entirely transmitted to the user.

DE-U1-29529969 discloses a bicycle saddle with a support structure having all the features of the preamble of the main claim 1. This known support structure is made of metal rods and thus is relatively heavy and uncomfortable.

SUMMARY OF THE INVENTION

The object of this invention is to overcome the above drawbacks, by providing a support structure that is highly efficient and relatively cost-effective.

A particular object is to provide a support structure that, in spite of its integral design, can almost entirely take up the normal stresses acting on a vehicle, regardless of the provision of a pad or any other shock absorbing device.

Finally, another object is to provide an integrated saddle structure that combines comfort features to the requirement of having a light-weight and resistant structure.

These objects, as well as others that will be apparent hereafter, are fulfilled by providing an integrated human body support structure to be connected to a movable or stationary frame according to claim 1.

These objects, as well as others that will be apparent hereafter, are fulfilled by providing an integrated human body support structure to be connected to a movable or stationary frame according to claim 1.

Thus, the support structure according to the invention allows to take up the shocks and stresses deriving from normal use of the vehicle on which it is mounted, as compared with prior art structures.

Thanks to the upper and lower elements being monolithically and elastically joined at one of their longitudinal ends, these elements may freely adjust the distance therebetween by movements substantially perpendicular thereto, which significantly helps to take up the stresses from the vehicle on which the structure is mounted.

Furthermore, the monolithic arrangement of the two upper and lower elements provides a highly aerodynamic structure, insofar as no external elements adding weight to the structure are present.

Advantageously, both the upper and lower elements may be made of the same base material, that is a substantially a rigid material selected from plastic resins and having a predetermined coefficient of elasticity.

Thanks to this configuration, the structure of the invention will have a particularly light weight and a high resistance.

Furthermore, the use of particularly cost-effective materials will avoid the use of special materials, such as aluminum or titanium alloys or advanced composite materials, which usually increase fabrication costs for a seat, and particularly a bicycle saddle.

Suitably, the lower element may have a connecting portion, substantially in the form of a profile securable to the movable or stationary frame by appropriate connection means.

Thanks to this additional feature of the invention, the structure may be easily and promptly adjusted in the longitudinal direction defined by the profile. Furthermore, the connection will be highly stable, and prevent any offset between the saddle and the means for connecting the saddle to the frame.

Advantageously, elastic damping means may be interposed between the upper element and the lower element, i.e. substantially a damping member made of a resilient material, preferably placed at one of the longitudinal ends of the structure elements.

Thanks to this additional feature, the structure of the invention may be equipped with an additional shock-absorbing element, which may be possibly adapted to the needs of any specific user.

Furthermore a preferably plate-like portion may be provided on the lower element for attachment of said damping means.

BRIEF DESCRIPTION OF THE DRAWINGS

Further features and advantages of the invention will be more apparent from the detailed description of a preferred, non-exclusive embodiment of an integrated human body support structure according to the invention, which is described by way of a non-limiting example with the help of the annexed drawings, in which.

DETAILED DESCRIPTION OF A PREFERRED EMBODIMENT

The support structure of the invention may support a seated human body, and may thus be configured as a car seat, a chair or a bicycle saddle, as shown in the figures.

Figure 1:
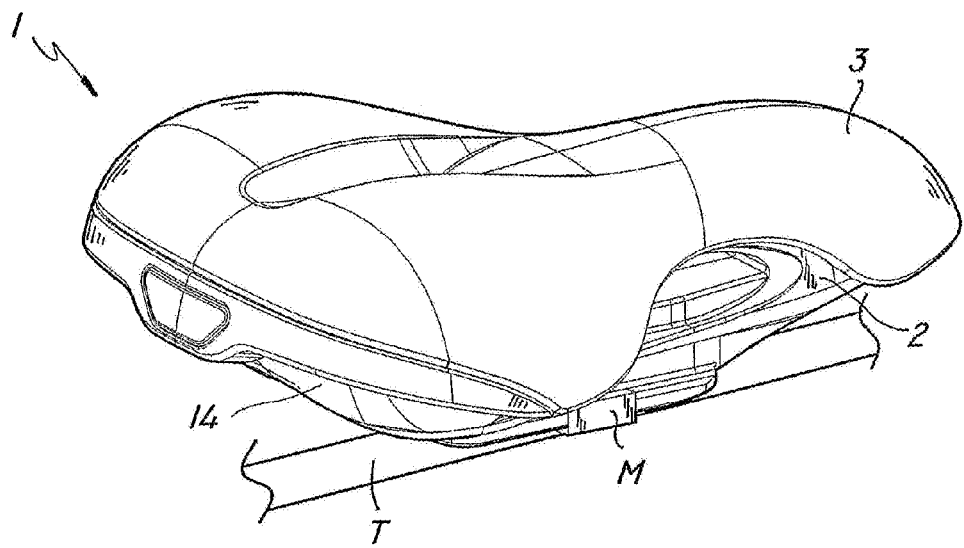
FIG. 1 is an elevation axonometric view of a support structure according to the invention.

As particularly shown in FIG. 1, the support structure, generally designated by numeral 1, may conventionally include a shell 2 for supporting a resilient pad 3, made of foam, sponge, elastomeric material, gel or the like. The saddle will be connected by suitable connection means M to the frame T of a bicycle.

Figure 2:
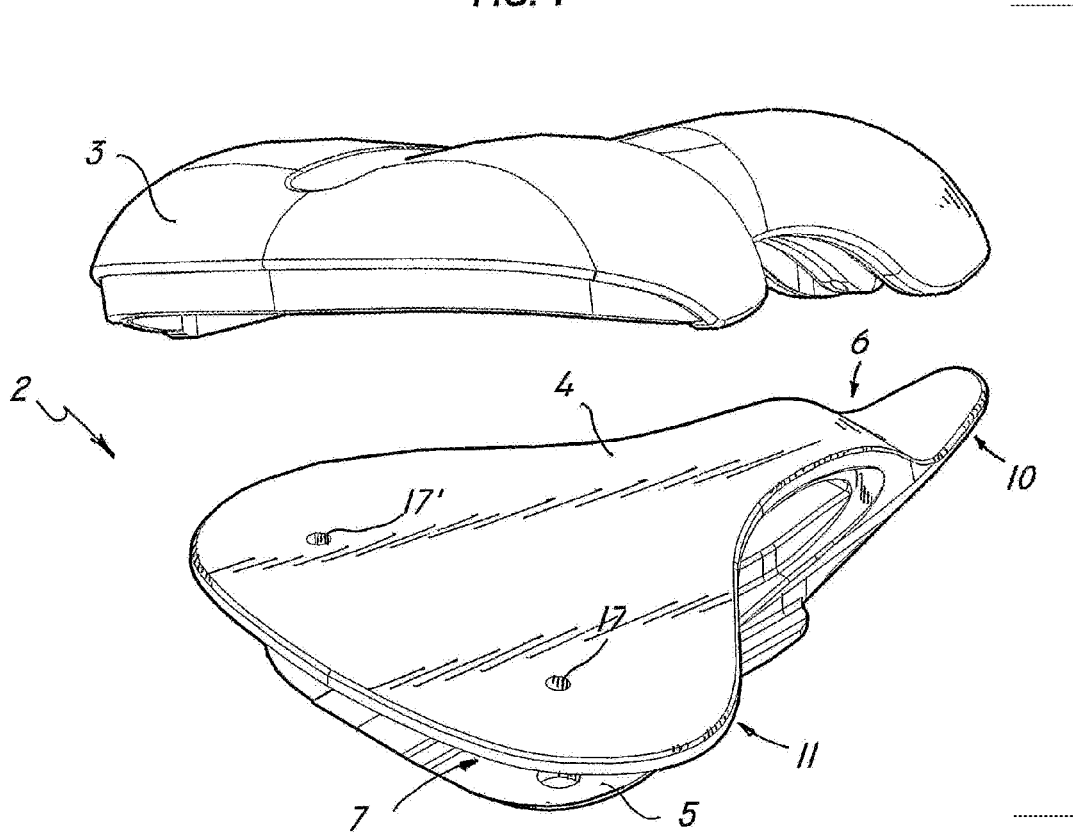
FIG. 2 is an exploded view of the support structure of FIG. 1 with certain details being omitted.
Figure 3:
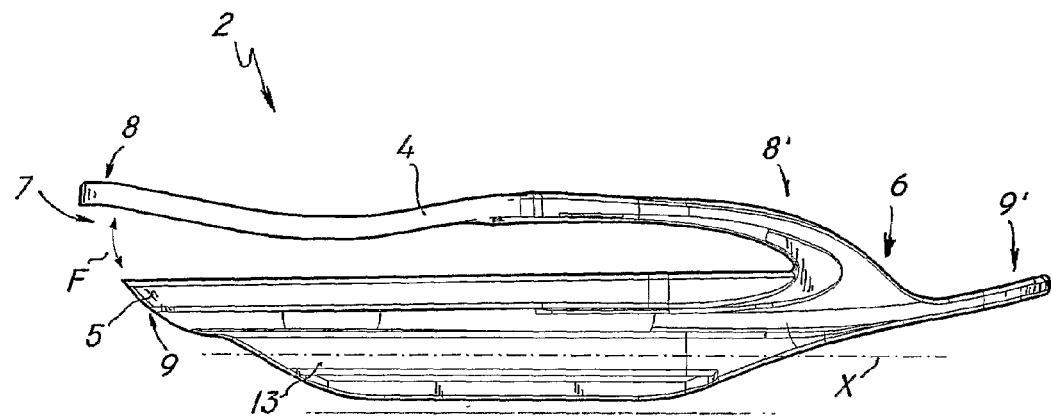
FIG. 3 is a side view of a detail of FIG. 2.
Figure 4:
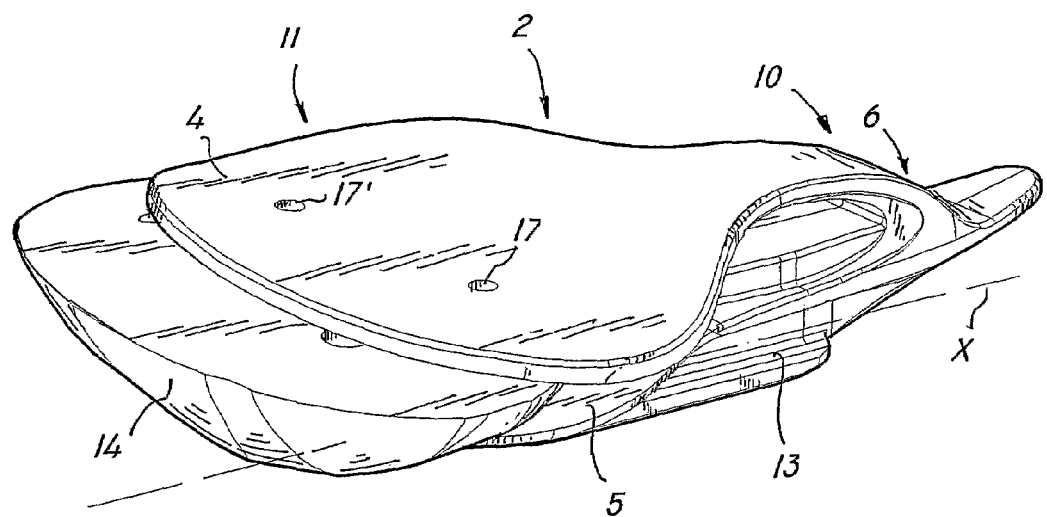
FIG. 4 is an exploded view of the support structure of FIG. 1 with certain details being omitted.
Figure 5:
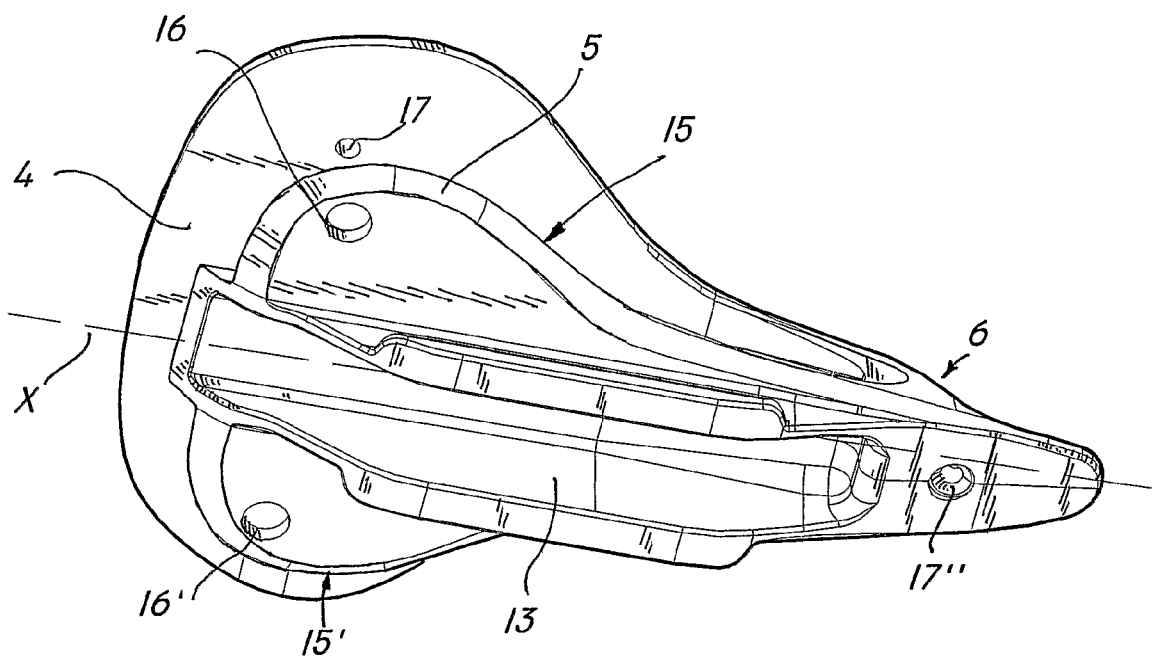
FIG. 5 is a bottom view of a detail of FIG. 2.

As shown in FIG. 2, the shell 2 comprises an upper element 4 for supporting a seated of a user, and a lower element 5, which is designed to connect the structure to the frame T. The elements 4 and 5 have upper longitudinal ends 8, 8' and lower longitudinal ends 9, 9'.

In accordance with the invention, the upper element 4 and the lower element 5 are monolithically joined at the free front end 6.

Also, the two elements 4 and 5 are transversely spaced to form a gap 7 whereby the opposite free ends 8 and 9 of the elements 4 and 5 can adjust the gap 7, in the direction of arrow F, in response to an applied load, e.g. when a cyclist sits on the saddle or rides across a depression in the ground.

Conveniently, the two elements 4 and 5 may be made of a rigid or semi-rigid material, namely reinforced polymer materials such as glass fiber-reinforced polyamide 66. A number of methods, such as molding, may be used to form them.

In a preferred, non exclusive embodiment of the invention, the upper element 4 may have an elongate front portion 10 and a widened rear portion 11, for optimized fit of the seated position of the user.

Preferably, the upper element 4 will have a tapered front end 6, to form a connecting portion having adequate elasticity and resistance to the stresses associated to cycling.

Advantageously, the lower element 5 may have a lower portion 13 in the form of a profile, mainly extending in the longitudinal direction, along axis X, to allow easy adjustment of the whole saddle in such direction of extension.

Suitably, proper elastic damping means 14, made of a resilient material such as an elastomer, may be inserted in the gap 7 defined by the two elements 4, 5. The element 14 may be formed directly therein by comolding.

To provide further stability in the coupling between the structure 1 and the damping body 14, the lower element 5 may substantially have a plate shape, with widened anchorage rear portions 15, 15'. This may suitably have through holes 16 for anchorage of the resilient pad 3 to the structure 1.

Furthermore, the upper element 4 may have through holes 17, 17', 17" for securing the saddle pad 3 thereto.

As is apparent from the foregoing, the integrated support structure of the invention fulfils the intended objects, and particularly it provides a support structure that, in spite of its integral design, can almost entirely take up the normal stresses acting on a vehicle, regardless of the provision of a pad or any other shock absorbing device.

Thanks to the upper and lower elements being monolithically and elastically joined at one of their longitudinal ends, these elements are free to adjust the distance therebetween along a plane that is substantially perpendicular thereto, which significantly helps to take up the stresses from the vehicle on which the structure is mounted.

The integrated support structure of this invention is susceptible of numerous modifications and changes falling, within the inventive concept disclosed in the appended claims. All the details thereof may be replaced by other technically equivalent parts, and the materials may vary depending on different needs, without departure from the scope of the invention.

While the invention has been described with particular reference to the accompanying figures, the numerals referred to in the disclosure and claims are only used for the sake of a better intelligibility of the invention and shall not be intended to limit the claimed scope in any manner.

The invention claimed is:

1. An integrated human body support structure, such as a saddle or vehicle seat for coupling to a movable or stationary frame, comprising:
   an upper element for supporting a seated user, said upper element having longitudinal end portions;
   a lower element for connection to said movable or stationary frame, said lower element having longitudinal end portions;
   said upper element being in facing and transversally spaced relationship with respect to said lower element, said upper element and said lower element being monolithically and elastically connected proximate to their front longitudinal end portions to define a gap therebetween such to allow their rear free ends to adjust said gap in response to a load variation applied to the structure;
   wherein said upper element has a substantially elongate shape,
   wherein the front longitudinal end portion of said upper element is tapered and connected to the front longitudinal end portion of said lower element, the rear free end portion of said upper element being wider than the front longitudinal end portion of said upper element, and
   wherein the front longitudinal end portion of the lower element extends forwardly of the front longitudinal end portion of the upper element, causing the front longitudinal end portion of the lower element to have greater length and thickness than the front longitudinal end portion of the upper element.

2. The structure as claimed in claim 1, wherein said upper element and said lower element are made of a same substantially rigid base material having a predetermined coefficient of elasticity.

3. The structure as claimed in claim 1, wherein said lower element comprises a portion configured for anchoring to said frame through connection means, said anchoring portion being substantially elongate in shape.

4. The structure as claimed in claim 3, wherein the portion of the lower element configured for anchoring to the frame comprises a pair of parallel rails disposed longitudinally.

5. The structure as claimed in claim 4, wherein the connections means are coupled to the pair of essentially parallel rails.

6. The structure as claimed in claim 1, further comprising elastic damping means interposed between said upper element and said lower element.

7. The structure as claimed in claim 6, wherein said damping means are placed between said upper element and said lower element proximate to their rear ends.

8. The structure as claimed in claim 6, wherein said lower element comprises abutment portions restraining said elastic damping means.

9. The structure as claimed in claim 6, wherein the elastic damping means comprise a block of an elastomeric material.

10. The structure of claim 9, wherein the elastomeric material is comolded with one or more of the upper or lower elements.

11. The structure as claimed in claim 1, further comprising an elastically yielding pad connectable to said upper element.

12. The structure as claimed in claim 11, wherein the front longitudinal end of the lower element comprises a front longitudinal extension configured to provide an extended coupling area with a front end of the elastically yielding pad.

13. The structure as claimed in claim 1, wherein the rear end portion of the upper and lower portions have parallel longitudinal axes.

* * * * *